United States Patent [19]
Pfau et al.

[11] 3,943,321
[45] Mar. 9, 1976

[54] PROCESS AND APPARATUS FOR ELECTRO-EROSION MACHINING BY ELECTRICAL DISCHARGES EMPLOYING VARIABLE CUT-OFF TIME INTERVALS BETWEEN PULSE TRAINS AND/OR PULSE TRAINS OF VARIABLE DURATIONS

[75] Inventors: Jean Pfau; Heinz Rhyner; Francois Balleys, all of Geneva, Switzerland

[73] Assignee: Ateliers des Charmilles, S.A., Geneva, Switzerland

[22] Filed: Aug. 24, 1973

[21] Appl. No.: 491,503

[30] Foreign Application Priority Data
Aug. 28, 1972 Switzerland.................. 12683/72

[52] U.S. Cl............. 219/69 M; 219/69 C; 219/69 P
[51] Int. Cl.[2]............................................ B23P 1/08
[58] Field of Search............ 219/69 M, 69 P, 69 C; 315/167

[56] References Cited
UNITED STATES PATENTS
3,056,065  9/1962  Porterfield................ 219/69 P
3,590,317  6/1971  Sennowitz................. 219/69 C
3,614,368  10/1971 Lobur....................... 219/69 C
3,623,148  11/1971 Berghausen............... 219/69 C
3,697,719  10/1972 Verner..................... 219/69 C
3,755,645  8/1973  Kauffman................. 219/69 C
3,789,182  1/1974  Verner..................... 219/69 C Primary Examiner—Bruce A. Reynolds
Attorney, Agent, or Firm—Hauke, Patalidis & Dumont

[57] ABSTRACT

An electro-erosion process and apparatus for improving the rate of material removal from a workpiece and for decreasing the rate of wear of the electrode tool in an electrical discharge machining apparatus, by controlling the average value of the machining current across the machining gap between the electrode tool and the workpiece by providing cut-off time intervals between consecutive pulse trains at a frequency of at least 200 Hz, and by controllably varying at least one of the parameters of operation consisting of the number of the pulses included within a single pulse train, the duration of application of said pulses within a single pulse train, and at least the longest of the intervals of time comprised between two consecutive voltage pulses.

17 Claims, 6 Drawing Figures

PROCESS AND APPARATUS FOR ELECTRO-EROSION MACHINING BY ELECTRICAL DISCHARGES EMPLOYING VARIABLE CUT-OFF TIME INTERVALS BETWEEN PULSE TRAINS AND/OR PULSE TRAINS OF VARIABLE DURATIONS

BACKGROUND OF THE INVENTION

The present invention relates to electro-erosion machining, or electrical discharge machining (EDM). Electro-erosion machining is influenced by any one or more of several parameters of operation, of a physical as well as chemical nature. The adjustment of the diverse machining parameters, such as the average machining current, the duration of the pulses and the rate of renewal of the dielectric fluid, is the result of a compromise between the rate of material removal from the workpiece, the electrode tool wear and the workpiece surface finish. It is known, for example, that the rate of wear of the electrode tool, especially when the electrode tool is made of copper, is influenced primarily by the duration and intensity of each electrical discharge, and secondarily by the duration of the cut-off time interval between two consecutive discharges and the physical and chemical states of the dielectric fluid. A decrease in the cut-off time interval causes a decrease in the rate of electrode tool wear, but correspondingly causes an increase in the contamination rate of the dielectric fluid and an increase of the number of abnormal discharges.

Means have been provided in the past to take advantage of those peculiarities in electrical discharge machining such as, more particularly, means consisting in controlling the duration of the time interval between two consecutive voltage pulses or in slowly varying the time interval as a function of the machining conditions (U.S. Pat. No. 3,614,368). It is also known to periodically apply high frequency relaxation pulses across the machining gap such as to obtain an improved deionization of the machining fluid (U.S. Pat. No. 3,056,065). Other processes attempt to avoid an excessive contamination of the machining fluid, for example by periodically interrupting the current pulses at a low frequency (1 to 2 Hz maximum) or in periodically withdrawing the electrode tool and increasing the fluid flow (Swiss Patent No. 414,034). It has also been proposed to apply across the machining gap series of pulses consisting of nominal current pulses of a variable amplitude greater than zero, separated by long duration pulses of greater amplitude (German Patent No. 1,165,242).

The processes have the common inconvenience of modifying the machining characteristics when the value of the average current is changed as a result of a switch-over to particular machining conditions. It is known that it is desirable to maintain constant the energy provided by each electrical discharge by applying across the machining gap current pulses of constant duration and amplitude. In order to decrease, for example, the average machining current, it is known to increase the time interval between two consecutive pulses, which results in changes in the machining characteristics and, more particularly, which increases the electrode tool wear. If, on the contrary, the machining conditions are such that the time interval between two consecutive pulses is decreased in order to increase the average machining current, such decrease of the time interval causes an increase of the machining fluid contamination, and an abnormal and destructive electrical discharge rate.

The present invention provides a novel process and apparatus permitting to modify the average value of the machining current in an EDM operation, without changing the machining characteristics such as to integrally maintain the advantages procured by constant energy electrical discharges. According to the present invention, the average machining current is controlled by providing current cut-off time intervals between consecutive pulse trains at an average frequency of at least 200 Hz and in varying the number of the pulses or the duration of the pulses within one pulse train and/or at least the longer one of the cut-off time intervals between two consecutive voltage pulses.

The invention achieves the result of decreasing the average machining current without increasing the electrode tool wear rate or, alternatively, of permitting to use a larger current than conventionally permissible in a given machining situation. The present invention improves sensibly the rate of material removal from the workpiece, expressed in amount of material removed per minute and per amp. The remarkable results achieved by the invention are attributed to the fact that the high frequency occurrence of the cut-off time intervals between two consecutive pulse trains influences favorably the random space distribution of the consecutive discharges and improves the random displacement of the discharge zone location. For example, the novel process of the invention may be used for cutting the average machining current in half by providing current pulses of 40 $\mu$s, separated by current cut-off time intervals of 20 $\mu$s between consecutive pulses, and by providing between each series, or train, of 12 of such pulses a cut-off time interval of the order of 1200 $\mu$s. Another example of application of the process of the invention consists of interposing between 3 current pulses of a duration of 330 $\mu$s each, separated by cut-off time intervals of 50 $\mu$s, a cut-off time interval of 3300 $\mu$s. In the latter case, the average current has been decreased by a ratio of 1 to 3. The process can be used for varying the average current in much greater proportions, such as, for example, in a ratio of 1 to 8.

It is also advantageous to use the process of the invention in combination with pulses having a high ionization voltage, such as 250 to 300 volts, or more. In that case, it is possible to decrease the nomial value of the cut-off time interval between two consecutive pulses to a value of a few $\mu$s, which permits to machine with an increased average current without increasing the wear of the electrode tool.

SUMMARY OF THE INVENTION

The present invention, therefore, has for a principal object to provide means for controlling the average machining current in EDM without causing a concommittent increase in wear of the electrode tool or, alternatively, for machining with an average current larger than the current normally used conventionally in a given machining situation. The present invention accomplishes its objects by providing the occurrence of cut-off time intervals between consecutive voltage pulse trains at an average frequency of at least 200 Hz, and/or by varying the number or the duration of the pulses within a pulse train period.

BRIEF DESCRIPTION OF THE DRAWING

The present invention will be best understood when the following description of some of the best modes for practicing the invention is read in conjunction with the accompanying drawing which illustrates, schematically and by way of examples, circuit diagrams illustrating practical embodiments of the present invention, and in which.

DETAILED DESCRIPTION OF THE PREFERRED EMBODIMENT

Figure 1A:
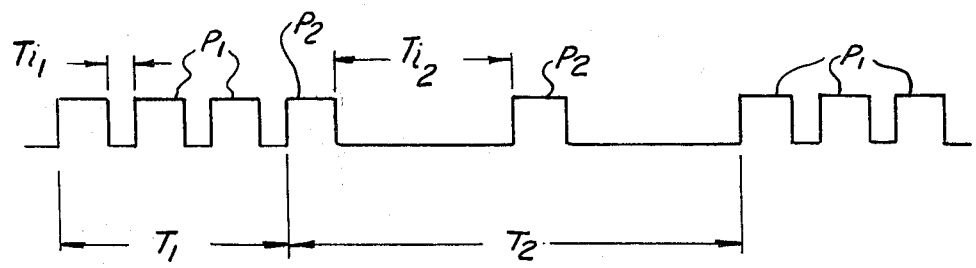
FIGS. 1a–1d illustrate examples of pulse train waveforms corresponding to four examples of applications of the process of the present invention.

Now referring first to FIG. 1a which shows a current waveform in the course of a single machining period in an EDM operation, a first train of 3 pulses $P_1$ is provided during a time period $T_1$, and a second train of 2 pulses $P_2$ during a time period $T_2$. The two consecutive first and second pulse trains are thereafter repeated during a machining operation.

The pulses $P_1$ and $P_2$ are equal in duration. However, the consecutive pulses $P_1$ of the first pulse train are separated by a cut-off time interval $T_{i1}$ which is relatively short, resulting in a relatively low rate of wear of the electrode tool but in a relatively high rate of contamination of the dielectric fluid. The 2 pulses $P_2$ occurring during the period of time $T_2$ are separated by a relatively long cut-off time interval $T_{i2}$, resulting in a relatively high rate of wear of the electrode tool, which in turn results in cleaning the electrode tool and decreasing the rate of contamination of the fluid. By adopting an appropriate ratio of the time periods $T_1$ and $T_2$ during which the first and second pulse trains occur, the average current of the electrical discharge is controlled and optimum machining conditions are approached with respect to the electrode tool wear rate and the dielectric contamination rate.

Figure 1B:
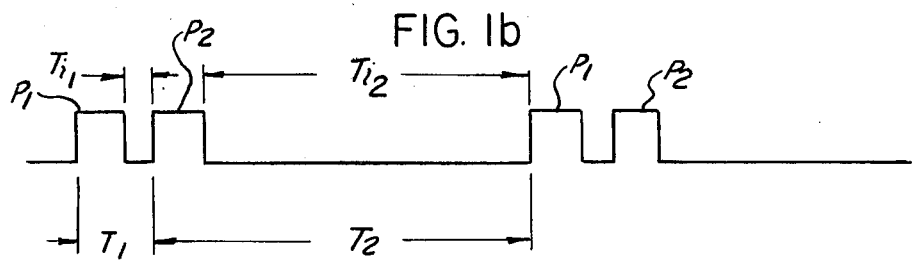

FIG. 1b illustrates a modification in which the pulse train includes only 2 current pulses $P_1$ and $P_2$ of equal durations, one such current pulse $P_1$ being obtained during the time period $T_1$ and the other current pulse $P_2$ being obtained during the period of time $T_2$. The current cut-off time interval between pulses $P_1$ and $P_2$ has a duration $T_{i1}$, and the cut-off time interval between the pulses $P_2$ and $P_1$ has a duration $T_{i2}$ longer than the cut-off time interval $T_{i1}$.

Figure 1C:
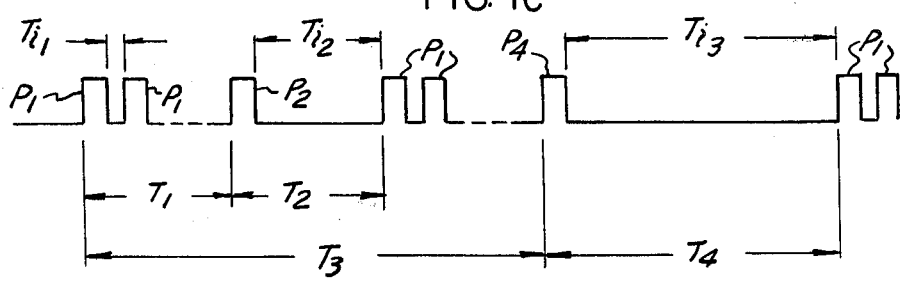

FIG. 1c illustrates conditions wherein each period $T_3$ of occurrence of each pulse train comprises a plurality of primary time periods, such as the consecutive time periods $T_1$ and $T_2$ represented, which alternate during such a time period $T_3$. The consecutive pulses $P_1$ in the time period $T_1$ are separated by a cut-off time interval $T_{i1}$. The consecutive pulses $P_2$ in the time period $T_2$ are separated by a cut-off time interval $T_{i2}$ which is larger than the cut-off time interval $T_{i1}$. The time period $T_3$ is followed by a time period $T_4$ which includes a substantially longer cut-off time interval $T_{i3}$ between consecutive pulses such as pulse $P_4$ and the first pulse $P_1$ than the cut-off time intervals $T_{i1}$ and $T_{i2}$ respectively. The time periods $T_3$ and $T_4$ continuously alternate during a machining cycle.

Figure 1D:
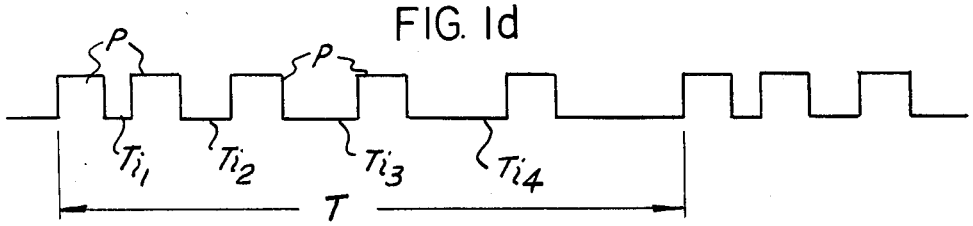

FIG. 1d represents a pulse train period T during which the current cut-off time interval $T_{i1}$, $T_{i2}$, $T_{i3}$ ... , $T_{in}$ between consecutive pulses P are progressively increased. The train of pulses P occurring within a period of time T is continuously repeated during a machining operation.

It will be appreciated that many variations may be provided. For example, instead of providing a frequency cyclical variation of the pulses as illustrated as FIGS. 1a–1d, an amplitude cyclical variation of the pulses could be provided, such amplitude cyclical variation being continuous, or discontinued, or combined if so desired with a frequency cyclical variation, or a cyclical variation of the pulse duration or of the cut-off intervals between consecutive pulses.

Figure 2:
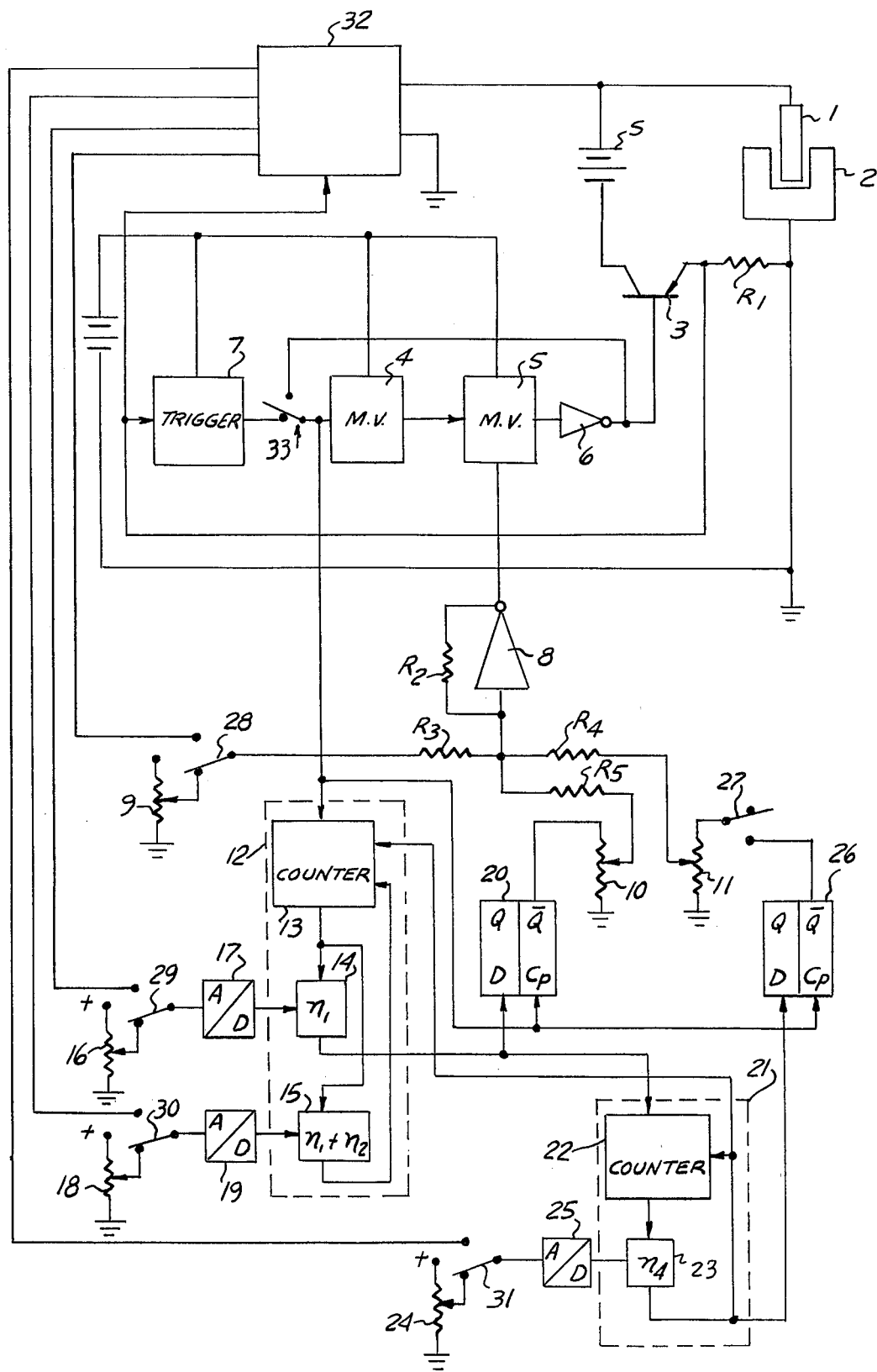
FIG. 2 schematically illustrates an example of circuit for practicing the present invention.

FIG. 2 illustrates a schematic circuit of a first example of embodiment permitting to accomplish the objects of the invention. The circuit of FIG. 2 comprises a conventional pulse generator for providing electrical discharges between an electrode tool 1 and a workpiece 2 obtained from a DC current source S by means of an electronic switching means arbitrarily represented by a transistor 3. The transistor 3 is controlled by a circuit comprising a pair of monostable multivibrators 4 and 5 connected in series, the multivibrator 5 controlling the base of the transistor 3 through an inverter 6.

The current flowing through the gap between the electrode tool 1 and the workpiece 2 in the course of each electrical discharge is detected as a voltage drop across a resistor $R_1$ connected in series with the emitter-collector circuit of the transistor 3. The voltage signal appearing at the junction between the resistor $R_1$ and the emitter of the transistor 3 is applied to the input of a Schmitt trigger 7 whose function it is to reshape the signal. The signal at the output of the Schmitt trigger 7 is applied, through a switch 33, to the input of the monostable multivibrator 4 to turn it to its unstable stage. While returning to its stable state, the monostable multivibrator 4 provides an output signal which causes the monostable multivibrator 5 to be turned to its unstable stage which in turn causes the transistor 3 to be switched off through the inverter 6. As soon as the monostable multivibrator 5 returns to its stable state, the transistor 3 conducts again, and a pulse appears across the resistor $R_1$ as soon as a discharge current flows across the gap, which causes a pulse to be applied by the Schmitt trigger 7 to the input of the monostable multivibrator 4. The monostable multivibrator 4 is therefore again turned to its unstable state, and the duration of this unstable state determines the duration of the discharge between the electrode tool 1 and the workpiece 2. The duration of the current cut-off time interval between two current pulses is thus determined by the duration of the unstable state of the monostable multivibrator 5. The duration of the unstable state of the multivibrator 5 may be set by adjusting the current or the voltage supplied to one of the internal circuits, not shown, of the multivibrator 5. For example, by increasing the voltage supplied to the time constant RC network of the circuit of the multivibrator, the duration of its unstable state is decreased, and vice versa. This variable voltage is supplied at the output of an amplifier 8 provided with a shunt resistor $R_2$ and three input resistors $R_3$, $R_4$ and $R_5$ which are arranged to operate as a volttage adder for three reference voltages, each obtained at the slider of one of the potentiometers 9, 10 and 11. The output voltage of the amplifier 8 is thus proportional to the sum of the three reference voltages and, when this output voltage is maximum, the monostable multivibrator 5 functions so as to provide a minimum duration $T_{i1}$ of its unstable stage.

Each control pulse at the input of the monostable multivibrator 4 corresponds to a pulse applied across the machining gap. The control pulse at the input of the monostable multivibrator 4 is also applied to a counting means 12 comprising a counter 13 and two number discriminators 14 and 15. The number discriminator 14 provides an output signal as soon as the number of pulses stored in the counter 13 reaches a predetermined number $n_1$ which is determined by a voltage level obtained at the slider of a potentiometer 16 in turn converted into numerical digital information by way of an analog to digital converter 17. The number discriminator 15 provides a signal which resets the counter 13 to zero as soon as an additional number $n_2$ of pulses has been applied across the machining gap. The latter number $n_2$ corresponds to a voltage level obtained at the slider of a potentiometer 18 which is converted into numerical digital information by way of an analog to digital converter 19.

The signal at the output of thd discriminator 14 is applied to the input D of a flip-flop 20 which stores this signal for the time period during which $n_2$ pulses are occurring. The voltage level of the output $\overline{Q}$ of the flip-flop 20 is placed across a potentiometer 10. After a number $n_1$ of pulses has occurred, the voltage level at the output $\overline{Q}$ of the flip-flop 20 returns to zero, and the duration of the current cut-off time interval between two pulses increases as a result of the decrease of the output voltage of the amplifier 8. After the occurrence of a number $n_2$ of pulses separated by a time interval of long duration $T_{i2}$, the output signal from the discriminator 14 disappears, and a voltage level appears at the output $\overline{Q}$ of the flip-flop 20 to again supply the potentiometer 10, and consequently the duration of the cut-off time interval between two pulses returns to its minimum value $T_{i1}$. Thus, under the conditions of, for example, $n_1=3$ and $n_2=2$, there is obtained a frequency occurrence cyclical variation of the machining circuit pulses are represented at FIG. 1a. If $n_1=n_2=1$, each period of modulation comprises two current pulses as shown at FIG. 1b. A pulse modulation according to the representation of FIG. 1c is obtained by placing the movable contact of a switch 27, connected to the input of the potentiometer 11, in the position causing the potentiometer to be supplied by the voltage level appearing at the output $\overline{Q}$ of a second flip-flop 26. Under that condition, a second counting means 21 receives at its input a signal each time that the number $n_1$ of pulses is reached. The signals are stored in a counter 22, and the numbers are compared by a discriminator 23 to a predetermined number $n_4$ corresponding to the voltage level at the slide of a potentiometer 24 converted into numerical digital information by means of an analog to digital converter 25. As soon as the number $n_4$ is reached, that is as soon as there have been $n_4$ occurrences of the cut-off time interval between two consecutive pulses, the discriminator 23 provides a signal which is stored by the flip-flop 26 and which simultaneously resets the counters 13 and 22 to zero. When this occurs, the voltage level at the output $\overline{Q}$ of the flip-flop 26 drops to zero and, as a result of the two potentiometers 10 and 11 no longer being supplied an input voltage, the duration of the next cut-off time interval takes a maximum value $T_{i3}$. In the course of the next pulse following that interval, the outputs $\overline{Q}$ of the flip-flops 20 and 26, respectively, change polarity, and the duration of the cut-off time interval takes its minimum value $T_{i1}$ until there appears an output signal from the discriminator 14.

With the movable contact of the diverse switches 28, 29, 30 and 31 in the position represented at FIG. 2, the minimum duration of the cut-off time interval between two consecutive pulses as well as the number of pulses which are followed by a cut-off time interval of a longer duration are set manually. The duration of the cut-off time intervals is adjusted by the position of the slider of the potentiometers 9, 10 and 11, respectively, while the number of pulses are determined by the respective positions of the sliders of the potentiometers 16, 18 and 24.

When the movable contact of the switches 28, 29, 30 and 31 is engaged with the second fixed contact of each of the switches, appropriate analog signals are supplied by a control circuit 32 which automatically set the parameters as a function of the rate of abnormal machining occurrences in the course of a machining operation, thus also permitting to adjust the average intensity of the electrical discharges in the course of the machining operation without changing the duration of the voltage and current pulses. According to the position occupied by the movable contact of the switch 33, connected in series between the Schmitt trigger 7 and the first monostable multivibrator 4, the pulse generator portion of the circuit controls either the duration of the current pulses or the duration of the voltage pulses. The control circuit 32 could also be arranged to supply numerical information in digital form which could be fed directly to the discriminators 14, 15 and 23.

Figure 3:
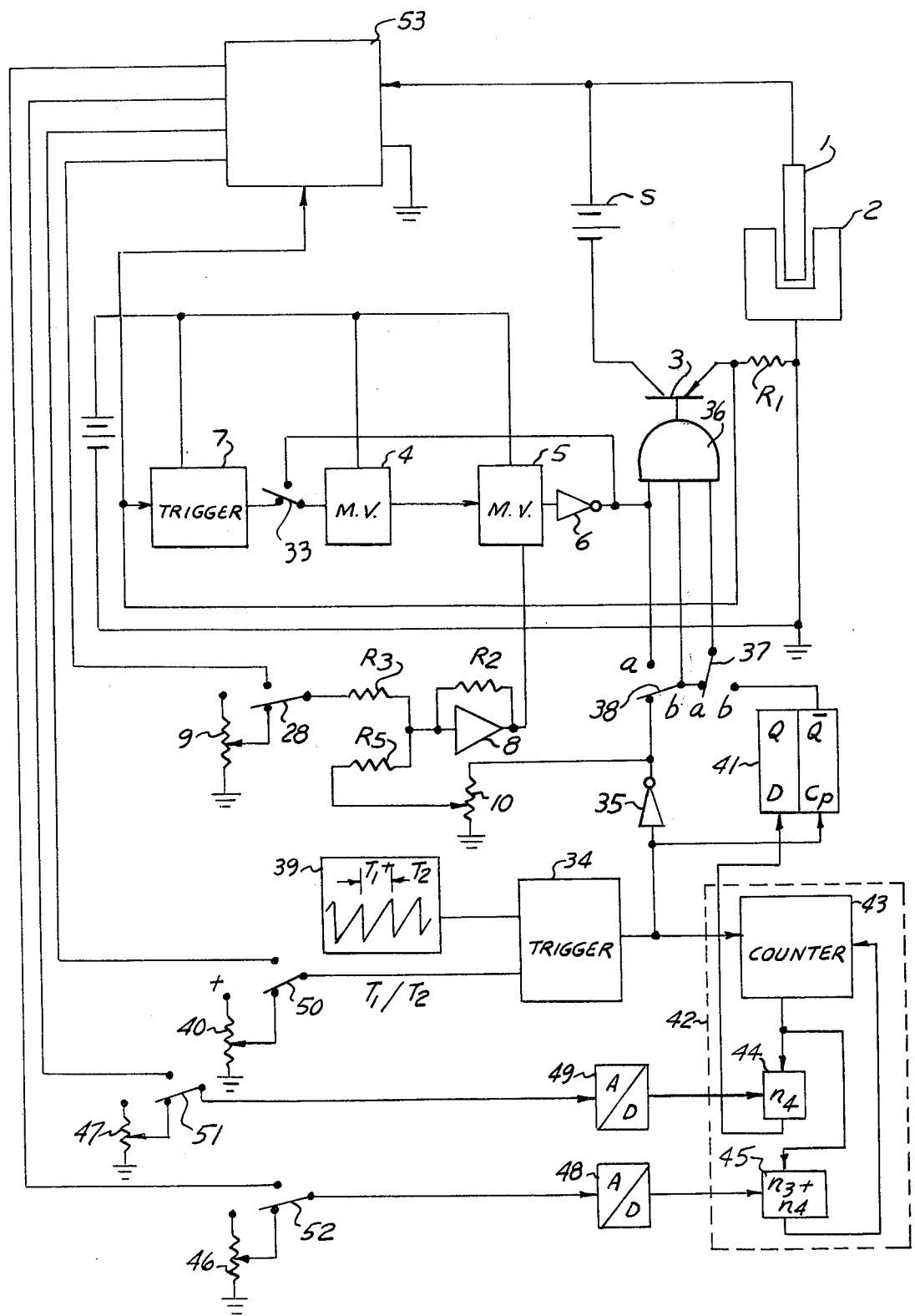
FIG. 3 illustrates a further example of circuit for practicing the present invention.

The schematic diagram represented at FIG. 3 illustrates another example of practical application of the invention. The circuit of FIG. 3 includes the same pulse generator as that shown at FIG. 2, the duration of the unstable state of the monostable multivibrator 5 being modified as a function of the voltage supplied by the amplifier 8. The voltage at the amplifier 8 is proportional to the sum of the voltages obtained at the slider of the potentiometers 9 and 10.

The voltage supplied to the potentiometer 10 is obtained at the output of a Schmitt trigger 34 through an inverter 35. The signal at the output of the inverter 35 is also supplied simultaneously to two of the three inputs of an AND gate 36, as long as the movable contacts of switches 37 and 38 are respectively in the position indicated at FIG. 3. The third input of the AND gate receives a signal from the output of the inverter 6. The output signal of the AND gate 36 controls a switching means disposed in series in the electrode tool 1 and workpiece 2 circuit, which, at FIG. 3, takes also the form of transistor 3.

The Schmitt trigger 34 is controlled by two voltage signals fed to separate inputs of the trigger. One voltage signal is supplied by a saw-tooth generator 39 adjusted to a predetermined frequency and the other voltage signal is obtained at the slider of a potentiometer 40. The period of the voltage spikes at the output of the saw-tooth generator 39 is equal to $T_1+T_2$. During the time interval $T_1$, the voltage spike at the output of the saw-tooth generator 39 is less than the voltage at the slider of the potentiometer 40, such that the Schmitt trigger 34 is inhibited, there is no signal appearing at its output and a voltage is applied across the potentiometer 10 by way of the inverter 35. Under those conditions, during the time interval $T_1$, the current pulses at the machining gap are separated by a minimum cut-off time interval $T_{i1}$.

The Schmitt trigger 34 supplies a signal of duration equal to $T_2$ during the period of time when the voltage spike at the output of the saw-tooth generator 39 is higher than the voltage at the slider of the potentiometer 40. This signal, inverted by the inverter 35, cuts off the voltage across the potentiometer 10. If the movable contact of the switch 38 is engaged with the fixed contact $a$ of the switch, the cut-off time interval $T_{i2}$ of long duration between two pulses is applied to the machining zone during the period of time $T_2$. When the movable contact of the switch 38 is engaged with the fixed contact $b$, the pulses are interrupted during the same period of time. In this manner, the waveforms represented at FIGS. 1a and 1b are obtained. The waveform represented at FIG. 1c is obtained by engaging the movable contact of the switch 37 with its fixed contact $b$ and the movable contact of the switch 38 with its fixed contact $b$. Under those conditions, the signals at the output of the monostable multivibrator 5 are supplied to the first input of the AND gate 36 through the inverter 6, the second input of the gate is connected to the inverter 35, and the third input of the gate is connected to the inverter output $\overline{Q}$ of a flip-flop 41. The flip-flop 41 has an input $C_p$ which receives a pulse each time the Schmitt trigger 34 provides an output pulse. The pulse signal at the output of the Schmitt trigger 34 is also supplied to a counting means 42 which comprises a counter 43 and two discriminators 44 and 45. Discriminator 44 supplies a signal at the input D of the flip-flop 41 after stroing $n_4$ successive counts of cut-off intervals of duration of $T_{i2}$ between two voltage pulses. That signal is stored in the flip-flop 41 and causes its $\overline{Q}$ output to drop to zero, which opens the transistor switch 3 through the switch 37 and the AND gate 36.

After an interval of time $T_{i3}$ corresponding to $n_3+n_4$ pulses at the output of the Schmitt trigger 34, the discriminator 45 resets the counter 43 to zero, and the $\overline{Q}$ output of the flip-flop 41 provides a signal which enables providing a new train of pulses separated by the minimum cut-off time interval $T_{i1}$. The reference numbers $n_3$ and $n_4$ are determined respectively by the voltage levels at the sliders of potentiometers 46 and 47, those voltage levels being respectively converted into digital numbers by the analog to digital converters 48 and 49, respectively. The switches 28, 50, 51 and 52 permit to connect the elements at their output either to the sliders of the potentiometers 9, 40, 42 and 46, respectively, or, alternatively, to an automatic control circuit 53 arranged to provide voltage references as a function of abnormal conditions of machining, for example as a function of the variation in machining voltage and current.

When the movable contact of the switch 38 is engaged with its fixed contact $a$ and the movable contact of the switch 37 is engaged with its fixed contact $b$, the periodicity of occurrence of machining pulses is varied in such manner that each period comprises a predetermined number of pulse trains of a duration $T_1$ with a cut-off time interval between consecutive pulses of a duration $T_{i1}$, and an equal number of pulse trains of duration $T_2$ with a cut-off time interval between consecutive pulses of a duration $T_{i2}$, greater than $T_{i1}$, followed by another cut-off time interval $T_{i3}$ of duration greater than $T_{i2}$.

It will be appreciated that other types of cyclical variation of the occurrence of pulses may be obtained according to the present invention by supplying a voltage reference across the potentiometer 40 which is obtained from a function generator, for example, an oscillator providing a sinusoidal, a saw-tooth or a square voltage signal modulated or not in amplitude or frequency. By means of an appropriate function generator, the waveform of FIG. 1d may thus be obtained.

Having thus described the invention by way of specific examples, modifications whereof will be evident to those skilled in the art, what is claimed and sought to be protected by United States Letters Patent is as follows:

1. In a process for machining a workpiece by means of intermittent electro-erosive discharges resulting from providing controlled voltage and current pulses across a gap formed between an electrode tool and said workpiece, said pulses being obtained from at least one DC source switched on and off across said gap for providing cut-off time intervals of a predetermined duration during which no substantial voltage is applied across the gap to prevent said discharges from occurring, the improvement comprising controlling the average current across said gap by cyclically and repetitively varying the duration of said cut-off time intervals, wherein a first train of pulses is applied across said gap during a predetermined time period $T_1$, said pulses in said first train being separated by a cut-off time interval $T_{i1}$ of predetermined duration, and a second train of pulses alternating with said first train of pulses is applied across said gap during a predetermined time period $T_2$, said second train of pulses having separated by a cut-off time interval $T_{i2}$ of predetermined duration.

2. The improvement of claim 1, wherein the duration of said cut-off time intervals is caused to take more than two predetermined values.

3. The improvement of claim 2, wherein said first train of pulses has a predetermined number of pulses separated by said first cut-off time interval $T_{i1}$ of predetermined duration, said second train of pulses has a predetermined number of pulses separated by said second cut-off time interval $T_{i2}$ of predetermined duration longer than time interval $T_{i1}$, and a third train of pulses is applied across said gap during a predetermined time period $T_3$, said pulses in said third train being separated by a cut-off time interval $T_{i3}$ of predetermined duration longer than said first and second cut-off time intervals.

4. The improvement of claim 2 wherein there is a single pulse in each train of pulses, and each of said cut-off intervals is of progressively increased duration.

5. The improvement of claim 1, wherein said first train of pulses has a predetermined number of pulses separated by said first cut-off time interval $T_{i1}$ of predetermined duration, said second train of pulses has a predetermined number of pulses separated by said second cut-off time interval $T_{i2}$ of predetermined duration, and said first and second trains are followed by a third cutoff time interval $T_{i3}$ of predetermined duration longer than said first and second cut-off time intervals.

6. The improvement of claim 1 wherein the duration of said cut-off intervals is varied at a frequency of at least 200 Hz.

7. In a process for machining a workpiece by means of intermittent electro-erosive discharges resulting from providing controlled voltage and current pulses across a gap formed between an electrode tool and said workpiece, said pulses being obtained from at least one DC source switched on and off across said gap for providing cut-off time intervals of a predetermined duration during which no substantial voltage is applied across the gap to prevent said discharges from occurring, the improvement comprising controlling the average current across said gap by cyclically and repetitively varying the duration of said cut-off time intervals at a predetermined frequency, wherein the step of cyclically and repetitively varying the duration of said cut-off intervals is obtained by providing a bistable time reference capable of occupying one of two states one of which corresponds to said cut-off time interval between two consecutive pulses, controlling said time reference as a function of an electrical magnitude representative of normal machining conditions, counting the number of pulses applied across said gap during a predetermined period, providing at least two electrical signals each of which is obtained in response to an indication that the number of said pulses correspond to a predetermined number, varying said electrical magnitude in level each time one of said signals is provided, and modifying as a function of said electrical magnitude the time duration during which said bistable time reference is in one of said states.

8. The improvement of claim 7 further comprising varying as a function of at least one electrical signal representing a rate of abnormal machining the number of said pulses.

9. The improvement of claim 8 further comprising varying as a function of at least one electrical signal representing a rate of abnormal machining one of said cut-off time intervals between two consecutive pulses.

10. The improvement of claim 7 wherein said step of providing a time reference comprises providing square pulses at a given frequency and variably controlling the time intervals separating said square pulses.

11. The improvement of claim 10 further comprising controlling said predetermined frequency as a function of at least one electrical signal representing a rate of abnormal machining.

12. The improvement of claim 11 further comprising varying as a function of at least one electrical signal representing a rate of abnormal machining one of said cut-off time intervals between two consecutive pulses.

13. The improvement of claim 10 further comprising varying as a function of at least one electrical signal representing a rate of abnormal machining one of said cut-off time intervals between two consecutive pulses.

14. The improvement of claim 7 further comprising controlling said predetermined frequency as a function of at least one electrical signal representing a rate of abnormal machining.

15. The improvement of claim 14 further comprising varying as a function of at least one electrical signal representing a rate of abnormal machining one of said cut-off time intervals between two consecutive pulses.

16. The improvement of claim 7 further comprising varying as a function of at least one electrical signal representing a rate of abnormal machining one of said cut-off time intervals between two consecutive pulses.

17. The improvement of claim 7 wherein the duration of said cut-off intervals is varied at a frequency of at least 200 Hz.

* * * * *

UNITED STATES PATENT OFFICE
CERTIFICATE OF CORRECTION

Patent No. 3,943,321　　　　　　　　Dated March 9, 1976

Inventor(s) Jean Pfau, Heinz Rhyner, Francois Balleys

It is certified that error appears in the above-identified patent and that said Letters Patent are hereby corrected as shown below:

Column 2, line 49, "nomial" should be --nominal--.

Column 5, line 24, "thd" should be --the--.

Column 7, line 33, "stroing" should be --storing--.

Column 8, line 33, after "having" insert --pulses--.

Signed and Sealed this

Twenty-seventh Day of July 1976

[SEAL]

Attest:

RUTH C. MASON
*Attesting Officer*

C. MARSHALL DANN
*Commissioner of Patents and Trademarks*